United States Patent
Kondo et al.

(10) Patent No.: US 8,365,705 B2
(45) Date of Patent: Feb. 5, 2013

(54) FUEL INJECTION VALVE (75) Inventors: Jun Kondo, Nagoya (JP); Tomiko Fujino, Okazaki (JP); Hiroshi Tsuda, Nagoya (JP)

(73) Assignee: Denso Corporation, Kariya (JP)

( * ) Notice: Subject to any disclaimer, the term of this patent is extended or adjusted under 35 U.S.C. 154(b) by 445 days.

(21) Appl. No.: 12/753,259

(22) Filed: Apr. 2, 2010

(65) Prior Publication Data
US 2010/0251999 A1 Oct. 7, 2010

(30) Foreign Application Priority Data
Apr. 3, 2009 (JP) .................................. 2009-90737

(51) Int. Cl.
F02M 51/00 (2006.01)
F02M 51/06 (2006.01)

(52) U.S. Cl. ...................................................... 123/494
(58) Field of Classification Search .................. 123/494, 123/470, 472, 498; 701/103; 73/114.45, 73/114.51
See application file for complete search history.

(56) References Cited

U.S. PATENT DOCUMENTS

| | | | |
|---|---|---|---|
| 4,438,496 A | | 3/1984 | Ohie |
| 5,890,653 A | * | 4/1999 | Kelly ................................ 239/5 |
| 5,988,142 A | | 11/1999 | Klopfer |
| 6,622,549 B1 | * | 9/2003 | Wlodarczyk et al. ...... 73/114.51 |
| 7,497,125 B2 | | 3/2009 | Toyoda |
| 2008/0228374 A1 | | 9/2008 | Ishizuka et al. |
| 2009/0118981 A1 | * | 5/2009 | Kondo et al. .................. 701/104 |
| 2009/0118982 A1 | * | 5/2009 | Kondo et al. .................. 701/104 |
| 2009/0118983 A1 | * | 5/2009 | Kondo et al. .................. 701/104 |
| 2009/0179090 A1 | | 7/2009 | Reiter |

FOREIGN PATENT DOCUMENTS

| | | |
|---|---|---|
| EP | 1 118 849 | 7/2001 |
| EP | 1 316 720 | 6/2003 |
| JP | P2003-161225 A | 6/2003 |
| JP | P2007-56816 A | 3/2007 |
| JP | 2009-222048 | 10/2009 |

OTHER PUBLICATIONS

Chinese Office Action dated Jul. 22, 2011, issued in corresponding Chinese Application No. 201010157133.1 with English Translation.
U.S. Appl. No. 12/753,256, filed Apr. 2, 2010.
U.S. Appl. No. 12/753,274, filed Apr. 2, 2010.
U.S. Appl. No. 12/753,280, filed Apr. 2, 2010.
Japanese Office Action dated Aug. 21, 2012, issued in corresponding Japanese Application No. 2009-090737 with English Translation.

* cited by examiner

*Primary Examiner* — Mahmoud Gimie
(74) *Attorney, Agent, or Firm* — Nixon & Vanderhye PC (57) ABSTRACT

A stem is installed to an injector body and is resiliently deformable upon receiving a pressure of high pressure fuel conducted through a high pressure passage of the injector body. A strain gauge is installed to the stem to sense a strain generated in the stem. A molded IC device executes an amplifying operation, which amplifies a signal received from the strain gauge. A retainer is threadably fastened to the injector body and is configured to be rotatable relative to the stem. The stem, the strain gauge the molded IC device are integrally assembled together to form a fuel pressure sensing unit, which is installed to the injector body by threadably fastening a threaded portion of the retainer to the injector body.

10 Claims, 5 Drawing Sheets

FUEL INJECTION VALVE

CROSS REFERENCE TO RELATED APPLICATION

This application is based on and incorporates herein by reference Japanese Patent Application No. 2009-90737 filed on Apr. 3, 2009.

BACKGROUND OF THE INVENTION

1. Field of the Invention

The present invention relates to a fuel injection valve, which is installed to an internal combustion engine and injects fuel through an injection hole thereof.

2. Description of Related Art

In order to accurately control an output torque and an emission state of an internal combustion engine, it is important to accurately control an injection state of a fuel injection valve (e.g., start timing of fuel injection at the fuel injection valve and the amount of fuel injected from the fuel injection valve). In view of the above point, there has been proposed a technique for sensing an actual injection state by sensing a pressure of fuel, which changes in response to fuel injection. For example, the actual start timing of the fuel injection may be sensed by sensing the start timing of decreasing of the fuel pressure caused by the start of the fuel injection, and the actual end timing of the fuel injection may be sensed by sensing the stop timing of increasing of the fuel pressure caused by the termination of the fuel injection (see, for example, Japanese Unexamined Patent Publication No. 2008-144749A corresponding to US 2008/0228374A1).

When a fuel pressure sensor (rail pressure sensor), which is directly installed to a common rail (accumulator), is used to sense the change in the fuel pressure, accurate measurement of the change in the fuel pressure is difficult since the change in the fuel pressure caused by the fuel injection is buffered in the common rail. In the case of the invention recited in Japanese Unexamined Patent Publication No. 2008-144749A, the fuel pressure sensor is installed to the fuel injection valve to sense the change in the fuel pressure caused by the fuel injection before the change in the fuel pressure is buffered in the common rail.

In the above fuel injection valve, a body has a high pressure passage, which conducts high pressure fuel to the injection hole. The body receives a needle and an actuator. The needle is reciprocated away from or toward the injection hole to open or close the injection hole, and the actuator drives the needle. The inventors of the present application have previously proposed to install a fuel pressure sensor, which is constructed in the following manner, to the body. Specifically, the fuel pressure sensor includes a flexure element, a sensor element and a signal processing circuit. The flexure element is installed to the body and is adapted to be resiliently deformed upon application of the pressure of the high pressure fuel to the flexure element. The sensor element converts the strain, which is generated in the flexure element, into a corresponding electrical signal. The signal processing circuit performs, for example, an amplifying operation, which amplifies the measurement signal outputted from the sensor element.

Prior to shipment of the injector to a market, various tests and inspections need to be performed on the fuel pressure sensor. These tests and inspections will be described below.

A thermal expansion deformation of the flexure element is increased when the fuel temperature is increased. Therefore, the output value of the fuel pressure sensor (i.e., the sensor output value, which is outputted from the signal processing circuit) is drifted. Thereby, the fuel pressure needs to be computed based on the sensor output value in view of the amount of the temperature drift discussed above. The amount of the temperature drift may be a flexure element specific value, which may vary from one flexure element to another flexure element. Therefore, the amount of the temperature drift needs to be obtained in advance through experiments (temperature characteristic test) before shipment of the fuel injection valve to the market.

Thereby, in an assembled state, in which the flexure element, the sensor element and the signal processing circuit are installed to the body, fuel, which is under a test temperature and a test pressure, is supplied to the high pressure passage of the body to apply the pressure of the fuel to the flexure element. The amount of the temperature drift for this specific test temperature is obtained based on the sensor output value, the test pressure and test temperature of the fuel at this test time. Furthermore, an abnormality inspection of the fuel pressure sensor is performed by checking whether the sensor output value, which is obtained for the specific test pressure, is out of a normal range.

In the installed state, in which the flexure element is installed to the body, the temperature of the flexure element and the temperature of the body need to be stabilized to the test temperature. However, a thermal mass (also called thermal capacitance or heat capacity) of the body is relatively large. Therefore, an extra time is required to stabilize the temperature of the body to the test temperature. Furthermore, when the abnormality is detected in the abnormality inspection, which is performed on the fuel injection valve in the assembled state where the fuel pressure sensor is installed to the body, the entire fuel injection valve needs to be handled as an abnormal product. Thereby, it causes a reduction in the manufacturing yield of the fuel injection valve.

SUMMARY OF THE INVENTION

The present invention is made in view of the above disadvantage. According to the present invention, there is provided a fuel injection valve being adapted to be installed to an internal combustion engine and having an injection hole to inject fuel therethrough. The fuel injection valve includes a body, a flexure element, a sensor element, a signal processing circuit and a threaded member. The body includes a high pressure passage, which is adapted to conduct high pressure fuel toward the injection hole. The flexure element is installed to the body and is resiliently deformable upon receiving a pressure of the high pressure fuel conducted through the high pressure passage. The sensor element is installed to the flexure element to sense a strain generated in the flexure element. The sensor element converts the sensed strain into a corresponding electrical signal. The signal processing circuit executes at least an amplifying operation, which amplifies the signal received from the sensor element. The threaded member is threadably fastened to the body and is configured to be rotatable relative to the flexure element. The flexure element, the sensor element and the signal processing circuit are integrally assembled together to form a fuel pressure sensing unit. The flexure element is clamped between the threaded member and the body by a threadably fastening force of the threaded member, so that the fuel pressure sensing unit is installed to the body.

BRIEF DESCRIPTION OF THE DRAWINGS

The invention, together with additional objectives, features and advantages thereof, will be best understood from the following description, the appended claims and the accompanying drawings in which:

DETAILED DESCRIPTION OF THE INVENTION

Various embodiments of the present invention will be described with reference to the accompanying drawings. In the following description, similar components will be indicated by the same reference numerals throughout the embodiments, and these similar components, which are discussed in the first embodiment, will not be described redundantly in the other embodiments for the sake of simplicity.

First Embodiment

Figure 1:
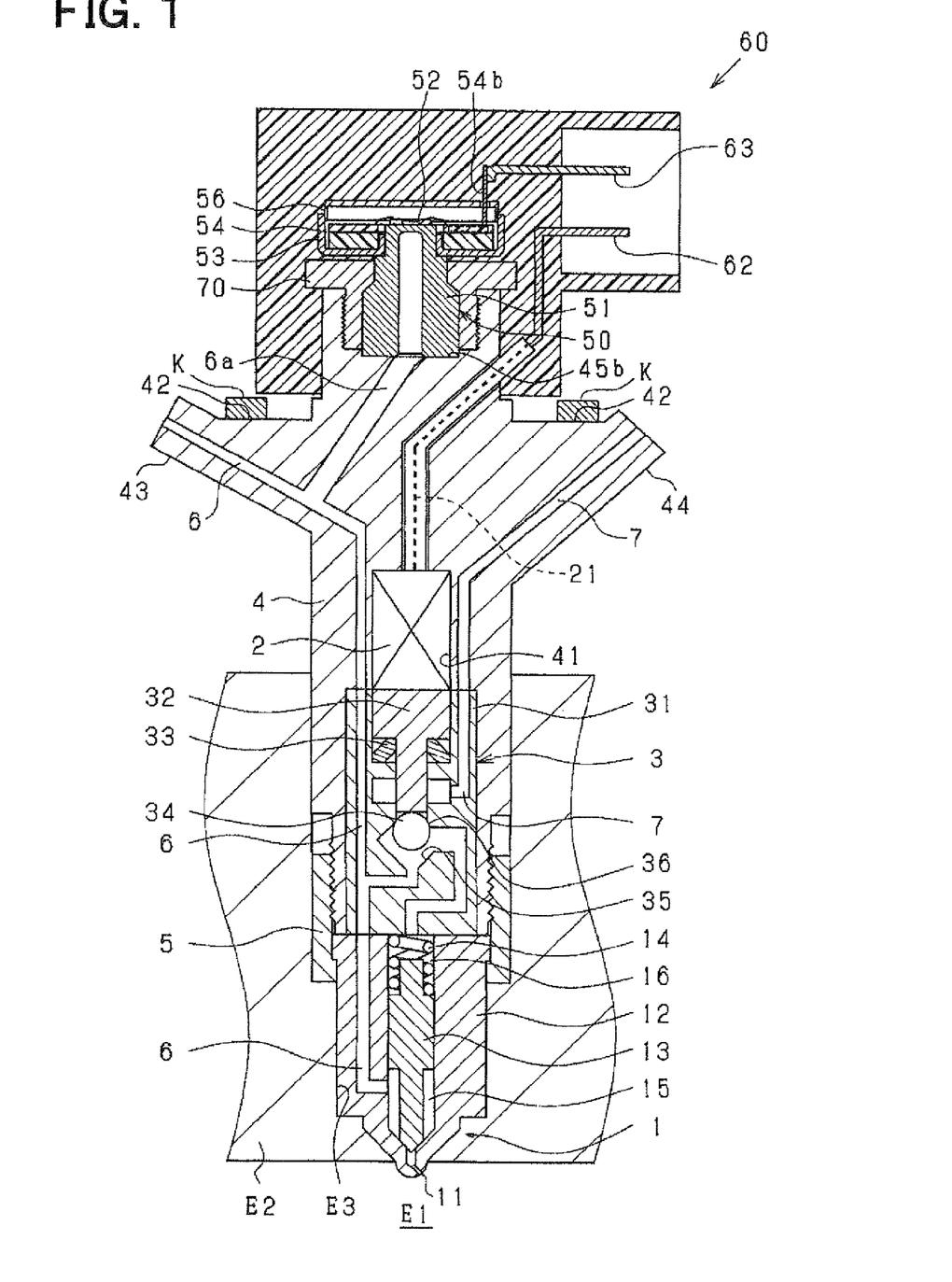
FIG. 1 is a schematic cross-sectional view of an injector according to a first embodiment of the present invention, schematically showing an internal structure of the injector.

The first embodiment of the present invention will be described with reference to FIGS. 1 to 3 and 4A. FIG. 1 is a cross-sectional view of an injector (fuel injection valve) of the present embodiment, schematically showing a structure of the injector. A basic structure and operation of the injector will be described with reference to FIG. 1.

The injector receives high pressure fuel stored in an undepicted common rail (accumulator) and injects the received high pressure fuel into a combustion chamber E1 that is defined in a corresponding cylinder of a diesel engine (internal combustion engine). The injector includes a nozzle 1, an electric actuator (drive means) 2 and a back pressure control mechanism 3. The nozzle 1 is provided to inject fuel therefrom at the valve opening time (i.e., the time of opening an injection hole of the injector to inject fuel). The electric actuator 2 is driven upon receiving electric power. The back pressure control mechanism 3 is driven by the electric actuator 2 to control the back pressure of the nozzle 1.

The nozzle 1 includes a nozzle body 12, a needle 13 and a spring 14. The injection hole 11 is formed through a wall of the nozzle body 12. The needle 13 is adapted to axially reciprocate away from and toward a valve seat of the nozzle body 12 to open and close the injection hole 11. The spring 14 urges the needle 13 in a valve closing direction (direction toward the valve seat and the injection hole 11 of the nozzle body 12).

The electric actuator 2 is a piezoelectric actuator, which includes a plurality of piezoelectric elements that are stacked one after another to form a piezoelectric stack. When the piezoelectric elements of the piezoelectric stack are electrically charged or discharged, the piezoelectric stack is expanded or contracted, respectively. In this way, the piezoelectric stack functions as the actuator that drives the needle 13. In place of the piezoelectric actuator, a solenoid actuator, which includes a stator and an armature, may be used.

The valve body 31 of the back pressure control mechanism 3 receives a piston 32, a Belleville spring 33 and a valve element 34. The piston 32 is driven in response to the expansion or contraction of the piezoelectric actuator 2. The Belleville spring 33 urges the piston 32 toward the piezoelectric actuator 2. The valve element 34 is configured into a spherical body and is driven by the piston 32.

An injector body 4, which is configured into a generally cylindrical tubular body, has a receiving hole 41, which is configured into a stepped cylindrical hole that extends in an axial direction of the injector (top-to-bottom direction in FIG. 1). The piezoelectric actuator 2 and the back pressure control mechanism 3 are received in the receiving hole 41. A retainer nut 5, which is configured into a generally cylindrical tubular body, is threadably engaged with the injector body 4, so that the nozzle 1 is securely held at a distal end part of the injector body 4.

A high pressure passage 6 and a low pressure passage 7 are formed in the nozzle body 12, the injector body 4 and the valve body 31. The high pressure fuel is always supplied from the common rail to the high pressure passage 6, and the low pressure passage 7 is connected to a fuel tank (not shown). Each of the nozzle body 12, the injector body 4 and the valve body 31 is made of metal and is hardened through a quenching process. Furthermore, the surface of each of the nozzle body 12, the injector body 4 and the valve body 31 is hardened through a carburization process (carbonitriding process).

The nozzle body 12, the injector body 4 and the valve body 31 are inserted into an insertion hole E3, which is formed in a cylinder head E2 of the engine. The injector body 4 has an engaging portion 42, which is engaged with one end part of a clamp K. A bolt, which is received in a through hole of the other end part of the clamp K, is threadably tightened into a corresponding bolt hole, which is formed in the top part of the cylinder head E2, so that the other end part of the clamp K is urged against the cylinder head E2, and thereby the one end part of the clamp K urges the engaging portion 42 into the insertion hole E3. Thus, the injector is secured while being urged into the insertion hole E3.

A high pressure chamber 15, which forms a part of the high pressure passage 6, is formed between an outer peripheral surface of a distal end part of the needle 13, which is placed adjacent to the injection hole 11, and an inner peripheral surface of the nozzle body 12. The high pressure chamber 15 is communicated with the injection hole 11 when the needle 13 is displaced in a valve opening direction (direction away from the valve seat and the injection hole 11). A back pressure chamber 16 is formed on the other axial side of the needle 13, which is opposite from the injection hole 11. The spring 14 is placed in the back pressure chamber 16.

The valve body 31 has a high pressure seat surface 35 and a low pressure seat surface 36. The high pressure seat surface 35 is formed in a passage, which communicates between the high pressure passage 6 in the valve body 31 and the back pressure chamber 16 of the nozzle 1. The low pressure seat surface 36 is formed in a passage, which communicates between the low pressure passage 7 in the valve body 31 and the back pressure chamber 16 of the nozzle 1. The valve element 34 is placed between the high pressure seat surface 35 and the low pressure seat surface 36.

The injector body 4 has a high pressure port (high pressure conduit connecting portion) 43, which is connected to an undepicted high pressure conduit, and a low pressure port (low pressure conduit connecting portion) 44, which is connected to an undepicted low pressure conduit. The fuel, which is received from the common rail through the high pressure conduit, is supplied to the high pressure port 43 of the injector body 4 from the outer peripheral surface side thereof. The fuel, which is supplied to the injector, flows into the high pressure chamber 15 and the back pressure chamber 16 through the high pressure passage 6.

A branch passage 6a is branched from the high pressure passage 6 in the other axial direction, which is opposite from the injection hole 11 in the injector body 4. The branch passage 6a conducts the fuel from the high pressure passage 6 to a fuel pressure sensor 50, which will be described later in detail. The branch passage 6a may possibly serve as a part of the high pressure passage 6.

A connector 60 is installed to a top part of the injector body 4, which is located on the other axial side that is opposite from the injection hole 11. The electric power, which is supplied from an external power source to a terminal (a drive connector terminal 62) of the connector 60, is supplied to the piezoelectric actuator 2 through a lead line (conductive line) 21. When the electric power is supplied to the piezoelectric actuator 2 through the terminal of the connector 60, the piezoelectric actuator 2 is expanded. In contrast, when the supply of the electric power to the piezoelectric actuator 2 is stopped, the piezoelectric actuator 2 is contracted.

In the contracted state of the piezoelectric actuator 2, as shown in FIG. 1, the valve element 34 is engaged with the low pressure seat surface 36. Therefore, the back pressure chamber 16 is communicated with the high pressure passage 6, and thereby the high fuel pressure is guided into the back pressure chamber 16. The fuel pressure in the back pressure chamber 16 and the urging force of the spring 14 urge the needle 13 in the valve closing direction, so that the injection hole 11 is closed.

In contrast, in the expanded state of the piezoelectric actuator 2, which is achieved by applying the voltage to the piezoelectric actuator 2, the valve element 34 is engaged with the high pressure seat surface 35. Therefore, the back pressure chamber 16 is communicated with the low pressure passage 7, and thereby the pressure of the back pressure chamber 16 is reduced to the low pressure. The fuel pressure in the high pressure chamber 15 urges the needle 13 in the valve opening direction, so that the injection hole 11 is opened to inject the fuel into the combustion chamber E1 through the injection hole 11.

When the fuel is injected through the injection hole 11, the pressure of the high pressure fuel in the high pressure passage 6 is changed. The fuel pressure sensor 50, which senses this pressure change, is installed to the injector body 4. The timing, at which the fuel pressure begins to decrease due to the start of the fuel injection through the injection hole 11, is sensed by monitoring a waveform, which indicates the measured pressure change that is measured with the fuel pressure sensor 50. In this way, the actual start timing of the fuel injection can be sensed. Furthermore, the timing, at which the fuel pressure begins to increase due to the termination of the fuel injection through the injection hole 11, is sensed. In this way, the actual end timing of the fuel injection can be sensed. Furthermore, in addition to the start timing and the end timing of the fuel injection, the maximum value of the fuel pressure decrease, which is caused by the fuel injection, is sensed. In this way, the amount of fuel injected through the injection hole 11 can be sensed.

Figure 2:
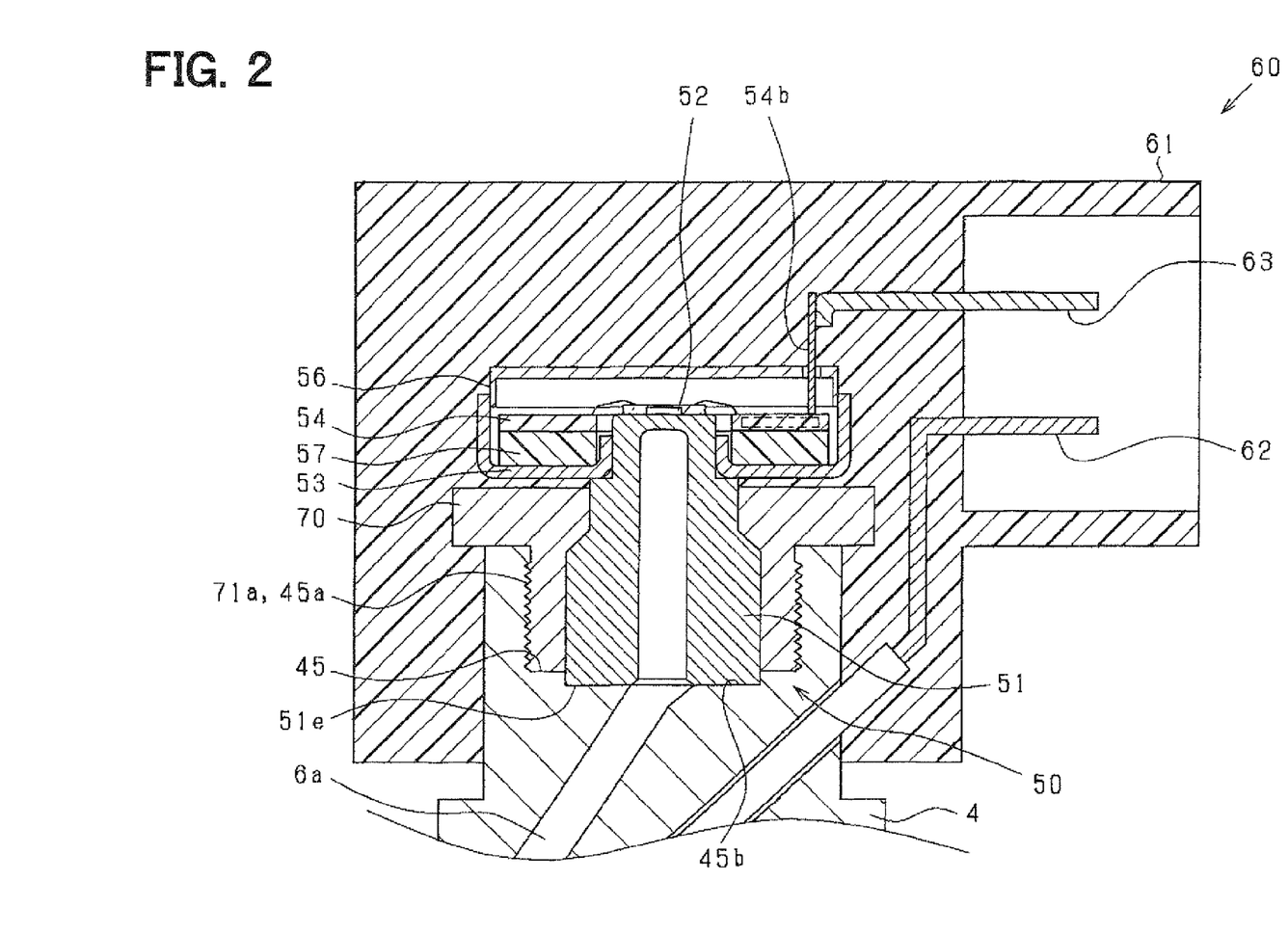
FIG. 2 is an enlarged partial cross-sectional view of the injector of FIG. 1, showing an area around a fuel pressure sensor of the injector.
Figure 3:
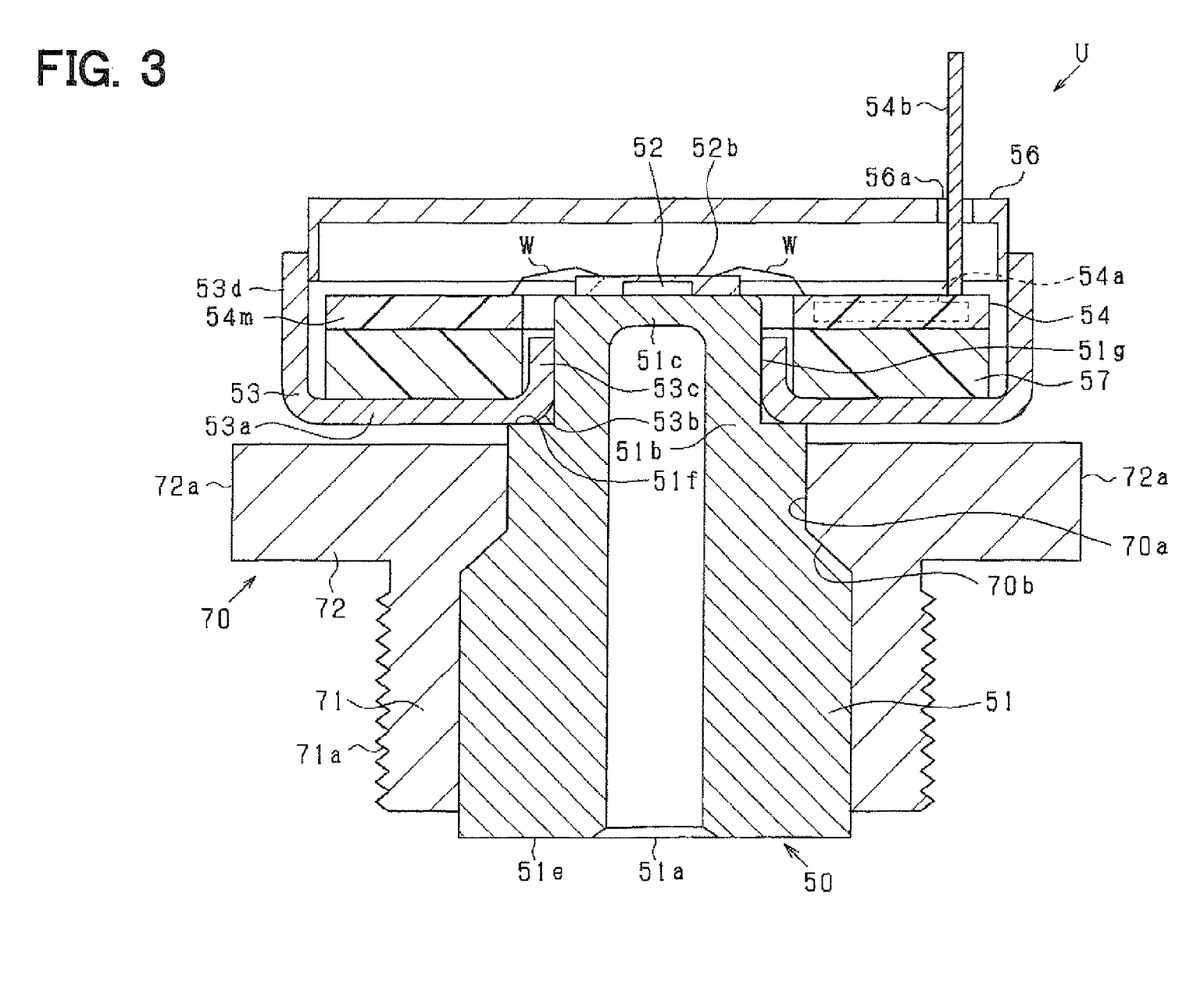
FIG. 3 is an enlarged cross-sectional view of a fuel pressure sensing unit, which is removed from an injector body of the injector of FIG. 1.

Next, the structure of the fuel pressure sensor 50 and the structure for installing the fuel pressure sensor 50 to the injector body 4 will be described with reference to FIGS. 2 and 3. FIG. 2 is an enlarged view of FIG. 1, and FIG. 3 is a cross-sectional view of a fuel pressure sensing unit shown in FIG. 2.

The fuel pressure sensor 50 includes a stem (flexure element) 51 and a strain gauge (sensor element) 52. The stem 51 is resiliently deformable upon application of the pressure of the high pressure fuel in the branch passage 6a. The strain gauge 52 senses the strain (the amount of the strain), which is generated in the stem 51, and converts the sensed strain into a corresponding electrical signal, and this electrical signal is outputted from the strain gauge 52 as a pressure measurement value.

The stem 51 is configured into a generally cylindrical hollow body having a flow inlet 51a at one axial end part thereof and a closed bottom at the other axial end part thereof. More specifically, the stem 51 includes a cylindrical tubular portion 51b and a diaphragm 51c. The cylindrical tubular portion 51b has the flow inlet 51a at one axial end part (cylindrical tubular end part) thereof to receive the high pressure fuel therethrough. The diaphragm 51c is configured into a circular disk body that closes the other axial end part of the cylindrical tubular portion 51b. The pressure of the high pressure fuel, which is supplied into the interior of the cylindrical tubular portion 51b through the flow inlet 51a, is applied to an inner peripheral surface of the cylindrical tubular portion 51b and the diaphragm 51c. In this way, the entire stem 51 is resiliently deformed.

The stem 51 is made of a metal material. Since the stem 51 receives the very high pressure, the metal material of the stem 51 needs to have a high strength and a high hardness. Furthermore, the amount of deformation of the metal material of the stem 51 caused by thermal expansion thereof needs be small to have a small influence on the strain gauge 52. That is, the metal material of the stem 51 needs to have a small coefficient of thermal expansion. Specifically, the metal material of the stem 51 may be an alloy that includes, for instance, iron (Fe), nickel (Ni) and cobalt (Co) or alternatively iron (Fe) and nickel (Ni) as its main components and further include titanium (Ti), niobium (Nb) and aluminum (Al) or alternatively titanium (Ti) and niobium (Nb) as its precipitation-hardening components. The metal material may be configured into the above described shape of the stem 51 by press-working, cutting or cold forging. Furthermore, the material, into which, for example, carbon (C), silicon (Si), manganese (Mn), phosphorus (P) and/or sulfur (S) are added, may be used as the material of the stem 51.

A recess 45 is formed in an end surface at the other axial end part of the injector body 4, which is opposite from the injection hole 11. The cylindrical tubular portion 51b of the stem 51 is received in the recess 45. A sensor side seal surface 51e is formed around the flow inlet 51a in an end surface at the one axial end part of the cylindrical tubular portion 51b. A body side seal surface 45b is formed in a bottom surface of the recess 45. The sensor side seal surface 51e and the body side seal surface 45b are annular around the flow inlet 51a and extend in a plane that is perpendicular to the axial direction (top-to-bottom direction in FIG. 2) of the stem 51. The sensor side seal surface 51e is tightly urged against the body side seal surface 45b to form a metal-to-metal seal (also referred to as a metal touch seal) between the injector body 4 and the stem 51.

The strain gauge 52 is installed to the outer surface (top surface) the diaphragm 51c. Specifically, the strain gauge 52 is fixed by encapsulating the strain gauge 52 with a glass member 52b through use of a heating technique, which heats a glass material of the glass member 52b to encapsulate the strain gauge 52. When the stem 51 is resiliently deformed, i.e., is resiliently expanded by the pressure of the high pressure fuel supplied into the interior of the cylindrical tubular portion 51b, the amount of strain (the amount of resilient deformation) generated on the diaphragm 51c is sensed with the strain gauge 52.

A housing (holding member) 53, which is made of a metal material, is installed to the stem 51. The housing 53 includes an IC holding portion (receiving portion) 53a, press-fitting portions 53c and rotation stopper tool engaging portions (hereinafter, simply referred to as engaging portions) 53d, which will be described below. The IC holding portion 53a is a generally circular disk body and is supported by the cylindrical tubular portion 51b of the stem 51.

A step 51f is formed in the outer peripheral surface of the cylindrical tubular portion 51b of the stem 51 due to a diameter difference along the outer peripheral surface of the cylindrical tubular portion 51b, and the IC holding portion 53a is placed on the step 51f. Furthermore, an outer diameter of the IC holding portion 53a is larger than the outer diameter of the cylindrical tubular portion 51b of the stem 51.

An insertion hole 53b is formed in the IC holding portion 53a, and the cylindrical tubular portion 51b of the stem 51 is inserted into the insertion hole 53b. When the cylindrical tubular portion 51b is inserted into the insertion hole 53b from the injector body 4 side, the strain gauge 52 is disposed in the interior of the housing 53.

Figure 4A:
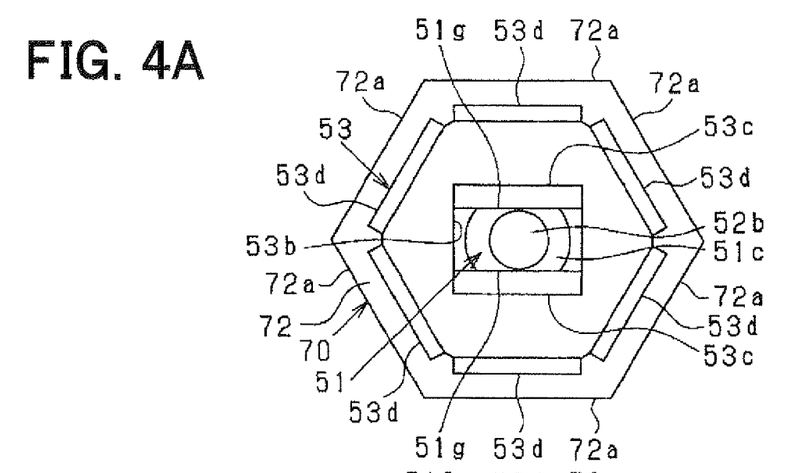
FIG. 4A is a top view showing the housing installed to the stem according to the first embodiment.

FIG. 4A is a top view showing a retainer 70, the housing 53 and the stem 51 upon the installation of the retainer 70 and the housing 53 to the stem 51.

As shown in FIGS. 3 and 4A, the press-fitting portions 53c are configured into generally planar bodies (plate like bodies) and are bent to axially project into the interior of the housing 53 from an end of the insertion hole 53b (an end surface, i.e., an inner surface of the IC holding portion 53a). In the present embodiment, the number of the press-fitting portions 53c is two. These two press-fitting portions 53c, which are configured into the generally planar bodies, are opposed to each other in a direction that is generally perpendicular to the projecting direction of the press-fitting portions 53c and is generally parallel to a plane of the IC holding portion 53a. Two planar fitting surface portions 51g, which are generally parallel to each other and are diametrically opposed to each other, are formed at the outer peripheral surface of the section of the cylindrical tubular portion 51b, which is adjacent to the diaphragm 51c. These fitting surface portions 51g of the cylindrical tubular portion 51b are press fitted between the press-fitting portions 53c. When the press-fitting portions 53c are press fitted against the fitting surface portions 51g, the housing 53 is installed to the stem 51 and is held non-rotatably relative to the stem 51, i.e., the housing 53 is non-rotatably installed to the stem 51.

The engaging portions 53d are placed one after another along the outer peripheral edge of the IC holding portion 53a to engage with an undepicted fastening tool, i.e., a rotation stopper tool (e.g., a spanner). The engaging portions 53d are provided to limit rotation of the stem 51 and the housing 53 along with the retainer 70 at the time of threadably fastening the retainer 70 with the rotary fastening tool (e.g., the spanner) in a manner that will be described later.

Specifically, a plurality of fitting surface portions, which radially outwardly project from the outer peripheral edge of the IC holding portion 53a, are bent in the axially direction to axially project toward the side opposite from the injector body 4 to form the engaging portions 53d. In the case of FIGS. 3 and 4A, the number of the engaging portions 53d is six to form a hexahedron when viewed from the top side or bottom side. A distance between the diametrically opposed two of the fitting surface portions, i.e., the tool engaging portions 53d is larger than the outer diameter of the cylindrical tubular portion 51b of the stem 51. Furthermore, the tool engaging portions 53d may be replaced with a single tool engaging portion which is continuously formed along the generally hexagonal outer peripheral edge of the IC holding portion 53a, if desired.

A molded integrated circuit (IC) device 54, which has a signal processing circuit, is supported on the IC holding portion 53a through a spacer 57. The molded IC device 54 is electrically connected to the strain gauge 52 through conductive wires W at a wire bonding process. The molded IC device 54 includes an electronic component 54a and sensor terminals 54b, which are held in the mold resin 54m by, for example, encapsulation.

The spacer 57 is provided to adjust the axial level (height) of the molded IC device 54 such that a wire bonding location of the molded IC device 54 and a wire bonding location of the strain gauge 52 are placed generally on the common plane.

When the spacer 57 is made of a resin material, the spacer 57 can function as a heat insulator to limit conduction of heat from the injector body 4 to the molded IC device 54 through the stem 51 and the housing 53 and thereby to limit a thermal damage of the molded IC device 54.

The electronic component 54a has, for example, an amplifier circuit for amplifying the measurement signal outputted from the strain gauge 52, a filtering circuit for filtering noises overlapped on the measurement signal outputted from the strain gauge 52, and a voltage applying circuit for applying an electric voltage to the strain gauge 52.

The strain gauge 52, to which the electric voltage is applied from the voltage applying circuit, has a bridge circuit, at which a value of electric resistance is changed in response to the amount of strain generated in the diaphragm 51c. In this way, the output voltage of the bridge circuit of the strain gauge 52 is changed in response to the amount of strain of the diaphragm 51c, and the output voltage of the bridge circuit is outputted from the strain gauge 52 to the amplifier circuit of the molded IC device 54 as the pressure measurement value, which indicates the pressure of the high pressure fuel. The amplifier circuit amplifies the pressure measurement value, which is outputted from the strain gauge 52 (more specifically, the bridge circuit of the strain gauge 52), and the amplified signal is outputted from the molded IC device 54 through a corresponding one of the sensor terminals 54b.

The mold resin 54m is configured into a cylindrical tubular body, which extends along the outer peripheral surface of the cylindrical tubular portion 51b of the stem 51. The sensor terminals 54b project out from the mold resin 54m. The sensor terminals 54b are electrically connected to the electronic component 54a in the interior of the molded IC device 54 and include, for example, the terminal for outputting the measurement signal of the fuel pressure sensor, the terminal for supplying the electric power, and the ground terminal connected to a ground.

A case 56, which is made of a metal material, is installed to a cylindrical tubular opening of the IC holding portion 53a of the housing 53. The diaphragm 51c of the stem 51, the strain gauge 52 and the molded IC device 54 are received in the interior of the case 56 and the housing 53. In this way, the metal case 56 and the metal housing 53 shield the external noises to protect the strain gauge 52 and the molded IC device 54 from the external noises. An opening 56a is formed in the case 56, and the sensor terminals 54b extend from the interior to the exterior of the case 56 through the opening 56a.

Referring back to FIG. 2, the housing 61 of the connector 60 holds drive connector terminals 62 and sensor connector terminals 63. The sensor connector terminals 63 are electrically connected to the sensor terminals 54b by, for example, laser welding. The connector 60 is adapted to connect with a connector of an external harness, which is connected to an external device, such as an undepicted engine electronic control unit (ECU). In this way, the pressure measurement signal, which is outputted from the molded IC device 54, is supplied to the engine ECU through the external harness.

The retainer (threaded member) 70, which is made of a metal material, is rotatably installed between the stem 51 and the housing 53 in a state (FIG. 3) before installation of the retainer 70 to the injector body 4. More specifically, the retainer 70 is configured to be rotatable relative to the stem 51 along the outer peripheral surface of the cylindrical tubular portion 51b. A through hole 70a is formed in the retainer 70 to receive the cylindrical tubular portion 51b of the stem 51. The cylindrical tubular portion 51b is loosely received in the through hole 70a. The retainer 70 includes a cylindrical tubular portion (cylindrical tubular portion of the threaded member) 71 and a flange 72, which will be described later.

The cylindrical tubular portion 71 of the retainer 70 is configured into a generally cylindrical tubular body that is engaged with and extends along an outer peripheral surface of the cylindrical tubular portion 51b of the stem 51. The cylindrical tubular portion 71 of the retainer 70 is received in the recess 45 of the injector body 4 along with the stem 51. A female threaded portion (body side threaded portion) 45a is formed in an inner peripheral surface of the recess 45, and a male threaded portion (sensor side threaded portion) 71a is formed in an outer peripheral surface of the cylindrical tubular portion 71 of the retainer 70. When the male threaded portion 71a of the retainer 70 is threadably fastened to the female threaded portion 45a of the injector body 4, the fuel pressure sensor 50 is installed to the injector body 4.

The flange 72 circumferentially extends around an outer peripheral surface of the cylindrical tubular portion 71 and radially outwardly projects from the outer peripheral surface of the cylindrical tubular portion 71 of the retainer 70. Radially outer planar end surfaces of the flange 72 form fitting surface portions, more specifically engaging portions 72a, respectively, which are configured to engage with the rotary fastening tool (e.g., the spanner) The rotary fastening tool (e.g., the spanner) is engageable with the engaging portions 72a of the retainer 70 to rotate the retainer 70 at the time of threadably fastening the retainer 70 against the injector body 4 through the engagement between the male threaded portion 71a and the female threaded portion 45a.

In the case of FIGS. 3 and 4A, the number of the engaging portions 72a is six to form a hexahedron when viewed from the top side or bottom side. A distance between the diametrically opposed two of the fitting surface portions, i.e., the engaging portions 72a is larger than the outer diameter of the cylindrical tubular portion 51b of the stem 51.

The retainer 70 has an abutting portion 70b, which is adapted to be urged against the stem 51 in the axial direction (top-to-bottom direction in FIG. 2) upon the threadably fastening of the retainer 70 against the injector body 4. The abutting portion 70b has a tapered surface, which is annular and is tilted, i.e., is angled relative to the axis of the stem 51. This tapered surface of the abutting portion 70b abuts against a shoulder of the cylindrical tubular portion of the stem 51. The stem 51 is clamped between the bottom surface of the recess 45 of the injector body 4 and the tapered surface of the abutting portion 70b of the retainer 70 by a threadably fastening force, which is generated at the time of threadably fastening the retainer 70 to the injector body 4. Thereby, the urging force (axial force), which urges the sensor side seal surface 51e and the body side seal surface 45b toward each other, is generated by the fastening of the retainer 70 to the injector body 4. That is, the installation of the fuel pressure sensor 50 to the injector body 4 and the generation of the axial force are simultaneously performed.

The fuel pressure sensor 50 (including the stem 51 and the strain gauge 52), the housing 53, the molded IC device 54, the case 56, the spacer 57 and the retainer 70 are integrally assembled as a unit, more specifically a fuel pressure sensing unit U. FIG. 3 is a cross-sectional view showing the fuel pressure sensing unit U, which is assembled in the above described manner. When the retainer 70 is threadably fastened to the injector body 4, the fuel pressure sensing unit U is detachably installed to the injector body 4.

Next, an assembling process of the fuel pressure sensing unit U will be described with reference to FIG. 3.

First of all, the stem 51, to which the strain gauge 52 is bonded or joined, is loosely received in the through hole 70a of the retainer 70. Next, the housing 53 is press fitted to the stem 51. Specifically, the fitting surface portions 51g of the stem 51 are press fitted to the press-fitting portions 53c of the housing 53. Thereafter, the spacer 57 and the molded IC device 54 are fixed to the housing 53. Then, the molded IC device 54 is connected to the strain gauge 52 through the wires W using a bonding machine in the wire bonding process. Next, the case 56 is installed to the housing 53. Thereafter, the sensor terminals 54b are electrically connected to the connector terminals 63, respectively, by, for example, laser welding. In this way, the assembling of the fuel pressure sensing unit U shown in FIG. 3 is completed.

Next, an installation process for installing the fuel pressure sensing unit U to the injector body 4 will be described.

First of all, the fuel pressure sensing unit U is installed to the injector body 4. Specifically, the rotary fastening tool is engaged with and is rotated together with the engaging portions 72a of the retainer 70, so that the retainer 70 is rotated. In this way, the male threaded portion 71a of the retainer 70 is threadably fastened to the female threaded portion 45a, which is formed in the recess 45 of the injector body 4. Through the threadably fastening operation, the fuel pressure sensing unit U is installed to the injector body 4, and the sensor side seal surface 51e is urged against the body side seal surface 45b to generate the axial force on the seal surfaces 51e, 45b, so that the metal-to-metal seal is formed between the seal surfaces 51e, 45b.

Prior to the rotation of the retainer 70 discussed above, the rotational position of the fuel pressure sensing unit U relative to the injector body 4 is set to a predetermined position, at which each of the sensor terminals 54b is placed its desirable position (position shown in FIG. 2). Then, the fastening tool (rotation stopper tool) is engaged with the engaging portions 53d of the housing 53 to limit the rotation of the stem 51, the housing 53, the molded IC device 54 and the like (i.e., the remaining components of the fuel pressure sensing unit U other than the retainer 70) along with the retainer 70 at the time of rotating the retainer 70.

Prior to the threadably fastening of the retainer 70 to the injector body 4, the injector body 4 is processed through the quenching process and the carburizing process to harden the surface of the injector body 4. At the time of executing the carburizing process, a carburization protection is provided to the body side seal surface 45b and the female threaded portion 45a to protect the body side seal surface 45b and the female threaded portion 45a from the carburization. For instance, at the time of executing the carburizing and quenching process, the body side seal surface 45b and the female threaded portion 45a may be masked to limit the hardening of the body side seal surface 45b and the female threaded portion 45a. Thereby, the rigidity of the body side seal surface 45b and the rigidity of the female threaded portion 45a become lower than that of the rest of the injector body 4.

Next, the drive connector terminals 62 are electrically connected to the lead lines 21. Also, the sensor connector terminals 63 are electrically connected to the sensor terminals 54b by, for example, the laser welding. This electrically connecting operation may be performed before the threadably fastening operation of the retainer 70 to the injector body 4. Thereafter, a molding process with mold resin is executed in the state where the connector terminals 62, 63 and the fuel pressure sensing unit U are installed to the injector body 4. This mold resin becomes the connector housing 61 discussed above. In this way, the installation of the fuel pressure sensing unit U to the injector body 4 is completed, and the internal electrical connections are made.

Next, there will be described a temperature characteristic test and an abnormality inspection, which are performed on the fuel pressure sensing unit U before the installation of the fuel pressure sensing unit U to the injector body 4.

When the fuel temperature is increased, the thermal expansion deformation of the stem 51 is increased. Therefore, the output value of the fuel pressure sensor unit U (i.e., the sensor output value outputted from the molded IC device 54) is drifted, i.e., fluctuated. Thereby, the fuel pressure needs to be computed based on the sensor output value in view of the amount of the temperature drift discussed above. The amount of the temperature drift is a specific value, which is specific to, for example, the stem 51 and the strain gauge 52. Therefore, the amount of the temperature drift needs to be obtained in advance through experiments before shipment of the injector to the market.

The fuel under the known test temperature and the known test pressure is supplied into the interior of the stem 51 through the flow inlet 51a, and thereby the pressure of this fuel is applied to the diaphragm 51c. The amount of the temperature drift for the test temperature is obtained based on the sensor output value, the test pressure and the test temperature of this test time (temperature characteristic test). A correction value, which is used to correct the sensor output value, is obtained based on the amount of the temperature drift. Alternatively, the sensor output value may be corrected in situ by using the amount of the temperature drift obtained in the above-described manner when the engine is operated upon installation of the injector to the engine.

Furthermore, prior to the shipment of the injector to the market, it may be checked whether the sensor output value for the test pressure is within a normal range. In this way, it is possible to check an abnormality in the strain gauge 52 and the molded IC device 54 alone before the installation of the fuel pressure sensing unit U to the injector body 4. Also, it is possible to check a malfunction at the welded electrical connections of the sensor terminals 54b and an electrical connection malfunction at the connections of the wires W in the fuel pressure sensing unit U before the installation of the fuel pressure sensing unit U to the injector body 4.

The present embodiment provides the following advantages.

(1) The fuel pressure sensor 50 (including the stem 51 and the strain gauge 52), the housing 53, the molded IC device 54, the case 56, the spacer 57 and the retainer 70 are integrally assembled as the fuel pressure sensing unit U, and the retainer 70 is threadably fastened to the injector body 4. In this way, the fuel pressure sensing unit U is installed to the injector body 4. Thereby, prior to the installation of the stem 51 and the molded IC device 54 to the injector body 4, the temperature characteristic test and the abnormality inspection can be executed on the fuel pressure sensing unit U alone before the installation of the fuel pressure sensing unit U to the injector body 4.

Therefore, at the time of executing the above test, the temperature adjustment may be made to stabilize only the stem 51. Thus, it is not required to adjust both of the stem 51 and the injector body 4 to the test temperature. In this way, the time required for the temperature adjustment can be shortened, and the work efficiency of the test can be improved. Furthermore, the above test can be performed on the fuel pressure sensing unit U alone. Therefore, the abnormality in the sensor output value can be discovered before the installation of the fuel pressure sensing unit U to the injector body 4. Thereby, it is possible to avoid the deterioration of the manufacturing yield of the injector.

(2) The retainer 70 is installed to the stem 51 in a manner that enables the rotation of the retainer 70 relative to the stem 51. Therefore, the retainer 70 can be rotated to threadably fasten the retainer 70 to the injector body 4 and thereby to install the fuel pressure sensing unit U to the injector body 4 without rotating the stem 51, the molded IC device 54 and the like (i.e., the remaining components of the fuel pressure sensing unit U other than the retainer 70). Therefore, each of the sensor terminals 54b can be placed to and held to its desirable position (the position shown in FIG. 2) at the time of the threadably fastening the retainer 70 to the injector body 4. As a result, with the above-discussed simple construction, the sensor terminals 54b can be electrically connected to the connector terminals 63, respectively, in the easy manner.

(3) When the retainer 70 is threadably fastened to the injector body 4, the fuel pressure sensing unit U is installed to the injector body 4, and at the same time, the axial force for urging the sensor side seal surface 51e and the body side seal surface 45b toward each other is generated. Therefore, the threaded portions 45a, 71a can be used for the purpose of installing the fuel pressure sensing unit U to the injector body 4 and also for the purpose of generating the axial force. Thus, in comparison to a case where another set of threaded portions is provided for the purpose of generating the axial force in addition to the threaded portions for installing the fuel pressure sensing unit to the injector body, the size of the injector can be reduced. Furthermore, the number of the fastening operations for threadably fastening the threaded portions together can be reduced, and thereby the productivity of the injector can be improved.

(4) The stem 51 directly contacts the injector body 4 to form the metal-to-metal seal between the stem 51 and the injector body 4. Therefore, the contact location for forming the metal-to-metal seal can be minimized to the single location. Thereby, the size of the injector can be reduced.

(5) The housing 53, which holds the molded IC device 54, is installed to the stem 51. Therefore, the size of the stem 51 can be reduced in comparison to the case where the molded IC device 54 is held by the stem 51. Thereby, the manufacturing costs can be reduced by reducing the size of the stem 51, the material costs of which are relatively high.

(6) The engaging portions 53d are formed in the housing 53, which is formed separately from the stem 51, to engage with the fastening tool (the rotation stopper tool). Therefore, the size of the stem 51 can be reduced in comparison to a case where engaging portions for engaging with the fastening tool (the rotation stopper tool) are formed in the stem 51. Thereby, the manufacturing costs can be reduced by reducing the size of the stem 51, the material costs of which are relatively high. Furthermore, the housing 53 can be used for the purpose of holding the molding IC device 54 and for the purpose of engaging with the fastening tool (the rotation stopper tool). Therefore, the size of the fuel pressure sensing unit U can be reduced.

(7) The fitting surface portions 51g of the stem 51 are press fitted to the press-fitting portions 53c, which are formed at the insertion hole 53b of the housing 53. Therefore, the housing 53 can be non-rotatably installed to the stem 51 in the easy way.

(8) The carburization protection is provided to the body side seal surface 45b to protect the body side seal surface 45b from the carburization at the time of hardening the injector body 4 in the carburizing process. Therefore, when the sensor side seal surface 51e is urged against the body side seal surface 45b to form the metal-to-metal seal, the plastic deformation of the body side seal surface 45b can be promoted. Thereby, the contact tightness between the body side seal surface 45b and the sensor side seal surface 51e is improved to improve the sealing performance of the metal-to-metal seal. When the sealing performance is increased by increasing the fastening force for threadably fastening the female threaded portion 45a and the male threaded portion 53e together to increase the urging force (axial force) for urging the stem 51 against the body side seal surface 45b or by increasing the processing accuracy of the seal surfaces 45b, 51e, the manufacturing costs are disadvantageously increased. In contrast, according to the present embodiment, the sealing performance of the metal-to-metal seal can be improved without increasing the axial force or the processing accuracy.

(9) The carburization protection is provided to the female threaded portion 45a at the time of hardening the injector body 4 in the carburizing process. Therefore, it is possible to limit the possibility of generating a delayed fracture at the female threaded portion 45a. When the recess 45 is entirely masked, the masking process for masking the body side seal surface 45b and the masking process for masking the female threaded portion 45a can be simultaneously executed. Therefore, the working efficiency can be improved in comparison to a case where the masking process for masking the body side seal surface 45b and the masking process for masking the female threaded portion 45a are individually separately executed.

(10) The sensor side seal surface 51e is formed at the end surface of the cylindrical tubular end part of the stem 51, which is located around the flow inlet 51a. Specifically, the cylindrical tubular end part of the stem 51, which forms the flow inlet 51a, is used to form the sensor side seal surface 51e. Therefore, the size of the stem 51 can be reduced.

(11) The stem 51 is formed separately from the injector body 4. Therefore, when the internal stress of the injector body 4, which is generated by the thermal expansion or contraction, is conducted to the stem 51, it is possible to increase a conduction loss of such an internal stress. Specifically, the stem 51 is formed separately from the injector body 4, so that the influences on the stem 51 caused by the strain of the injector body 4 is reduced. Therefore, according to the present embodiment, in which the strain gauge (sensor element) 52 is installed to the stem 51 formed separately from the injector body 4, it is possible to further limit the influences on the strain gauge 52 caused by the strain generated in the injector body 4 in comparison to a case where the strain gauge 52 is directly installed to the injector body 4.

(12) The material of the stem 51 has the coefficient of thermal expansion, which is smaller than that of the injector body 4. Therefore, it is possible to limit the generation of the strain on the stem 51 caused by the thermal expansion or contraction of the stem 51. Furthermore, in comparison to a case where the entire injector body 4 is made of the expensive material having the small coefficient of thermal expansion, it is possible to reduce the material costs since it is only required to make the stem 51 from the expensive material, which has the small coefficient of thermal expansion.

(13) The drive connector terminals 62 and the sensor connector terminals 63 are held by the common connector housing 61, so that the drive connector terminals 62 and the sensor connector terminals 63 are placed in the common connector 60. Therefore, the fuel pressure sensor 50 can be installed to the injector without increasing the number of connector(s). Thereby, the harness, which interconnects between the external device (e.g., the engine ECU) and the connector(s), can be extended from the single connector 60, which is provided to the injector body 4. Thereby, the placement and connection of the harness can be easily performed. Also, it is possible to avoid an increase in the number of assembling steps for the connector connecting operation.

Second Embodiment

In the first embodiment, the two fitting surface portions 51g are formed to the cylindrical tubular portion 51b of the stem 51, and the two press-fitting portions 53c are formed in the housing 53. The fitting surface portions 51g are press fitted to the press-fitting portions 53c, so that the housing 53 is non-rotatably installed to the stem 51.

Figure 4B:
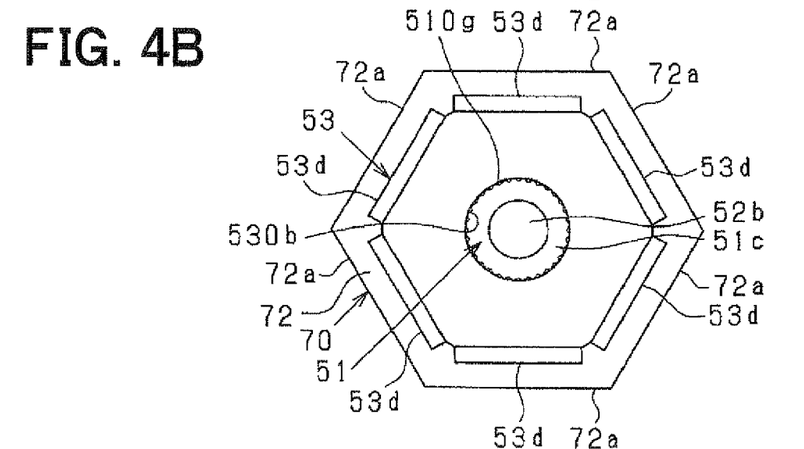
FIG. 4B is a top view showing a housing installed to a stem according to a second embodiment of the present invention.

In the second embodiment, as shown in FIG. 5B, knurled grooves (knurled surface) 510g are formed in the outer peripheral surface of the cylindrical tubular portion 51b of the stem 51, and knurled grooves (knurled surface) 530b are formed in the inner peripheral surface of the insertion hole 53b of the housing 53. The knurled grooves 530b of the housing 53 are press fitted to the knurled grooves 510g of the stem 51, so that the housing 53 is non-rotatably installed to the stem 51.

Figure 4C:
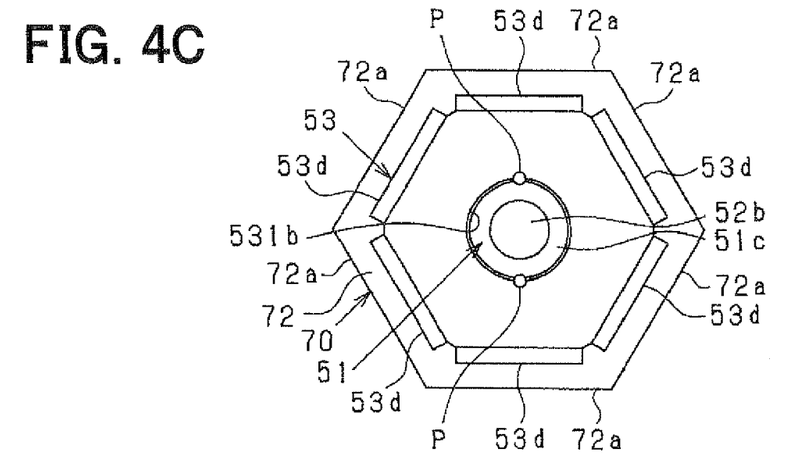
FIG. 4C is a top view showing a modification of the second embodiment shown in FIG. 4B.

Alternatively, as shown in FIG. 4C, a plurality (two in this instance) of fixation pins P may be provided. Each fixation pin P is press fitted into a corresponding gap between the inner peripheral surface of the insertion hole 531b of the housing 53 and the outer peripheral surface of the cylindrical tubular portion 51b of the stem 51. In this way, the housing 53 is non-rotatably installed to the stem 51. Thereby, the advantages, which are similar to those of the first embodiment, can be achieved.

Third Embodiment

Figure 5:
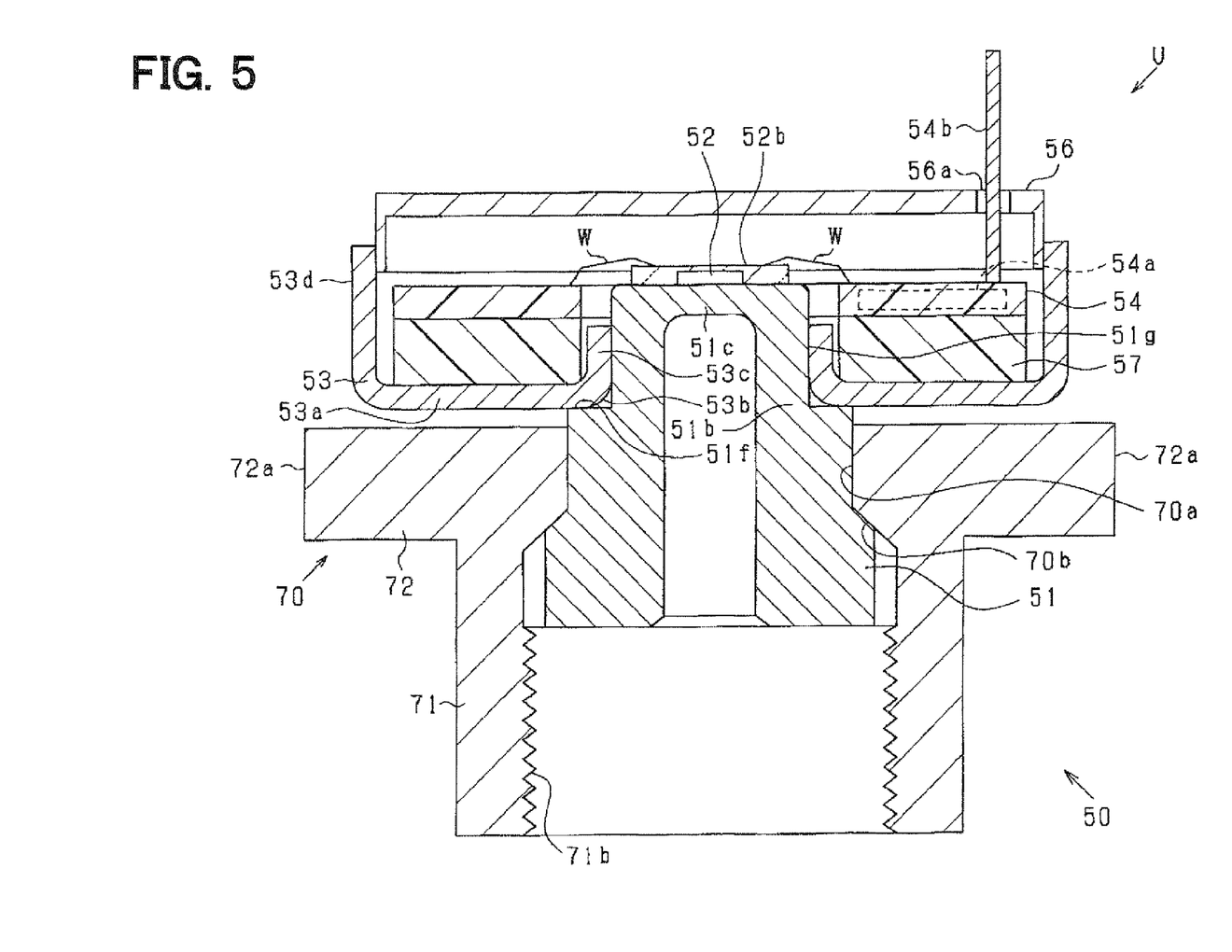
FIG. 5 is a cross-sectional view showing a fuel pressure sensing unit according to a third embodiment of the present invention.

In the first embodiment, when the retainer 70 is threadably fastened to the injector body 4, the sensor side threaded portion 71a, which is formed in the retainer 70, is formed as the male threaded portion, and the body side threaded portion 45a, which is formed in the injector body 4, is formed as the female threaded portion. In contrast, according to the third embodiment, as shown in FIG. 5, a sensor side threaded portion 71b, which is formed in the inner peripheral surface of the cylindrical tubular portion 71 of the retainer 70, is formed as a female threaded portion, and a body side threaded portion (not shown), which is formed in an outer peripheral surface of a stub (protrusion) of the injector body 4, is formed as a male threaded portion. The stub of the injector body 4 axially protrudes from the rest of the injector body 4, and the branch passage 6a extends through the stub to communicate with the flow inlet 51a of the stem 51. The body side seal surface is formed in the top surface of the stub around the opening of the branch passage 6a. Specifically, the cylindrical tubular portion 71 of the retainer 70 is axially further extended from the sensor side seal surface 51e of the stem 51 toward the injector body 4 side, and the female threaded portion 71b (sensor side threaded portion) is formed in the inner peripheral surface of this extended section of the cylindrical tubular portion 71.

Thereby, the advantages, which are similar to those of the first embodiment, can be achieved.

The present invention is not limited to the above embodiments, and the above embodiments may be modified as follows. Furthermore, any one or more of the features of any one of the embodiments may be combined with any one or more of the features of any other one of the embodiments.

In each of the above embodiments, the stem 51 is press fitted to the housing 53, so that the housing 53 is non-rotatably installed to the stem 51. Alternatively, the stem 51 and the housing 53 may be joined together by welding. In this way, the housing 53 is non-rotatably installed to the stem 51.

In the first embodiment, the molded IC device 54 is supported by the housing 53, which is installed to the stem 51. Alternatively, the housing 53 may be eliminated, and the molded IC device 54 may be supported by the stem 51.

In each of the above embodiments, the strain gauge 52 is used as the sensor element, which senses the amount of strain on the stem 51. Alternatively, a piezoelectric element or any other suitable sensor element may be used to sense the amount of strain on the stem 51.

In each of the above embodiments, the present invention is applied to the injector that is configured such that the high pressure port 43 is formed in the outer peripheral surface of the injector body 4 to supply the high pressure fuel from the outer peripheral surface side of the injector body 4. Alternatively, the present invention may be applied to an injector that is configured such that the high pressure port 43 is formed to the axial side of the injector body 4, which is opposite from the injection hole 11 to supply the high pressure fuel from the axial side of the injector body 4.

In each of the above embodiments, the present invention is implemented in the injector of the diesel engine. Alternatively, the present invention may be implemented in an injector of a gasoline engine, particularly a direct injection gasoline engine, in which fuel is directly injected into the combustion chamber E1.

What is claimed is:

1. A fuel injection valve being adapted to be installed to an internal combustion engine and having an injection hole to inject fuel therethrough, the fuel injection valve comprising:
   a body that includes a high pressure passage, which is adapted to conduct high pressure fuel toward the injection hole;
   a flexure element that is installed to the body and is resiliently deformable upon receiving a pressure of the high pressure fuel conducted through the high pressure passage;
   a sensor element that is installed to the flexure element to sense a strain generated in the flexure element, wherein the sensor element converts the sensed strain into a corresponding electrical signal;
   a signal processing circuit that executes at least an amplifying operation, which amplifies the signal received from the sensor element; and
   a threaded member that is threadably fastened to the body and is configured to be rotatable relative to the flexure element, wherein:
   the flexure element, the sensor element and the signal processing circuit are integrally assembled together to form a fuel pressure sensing unit; and
   the flexure element is clamped between the threaded member and the body by a threadably fastening force of the threaded member, so that the fuel pressure sensing unit is installed to the body.

2. The fuel injection valve according to claim 1, wherein:
   the flexure element has a sensor side seal surface, which is urged against the body to form a metal-to-metal seal between the sensor side seal surface and the body; and
   the sensor side seal surface is urged against the body by the threadably fastening force of the threaded member.

3. The fuel injection valve according to claim 2, wherein:
   the flexure element is configured into a generally cylindrical hollow body having a flow inlet at one axial end part thereof and a closed bottom at the other axial end part thereof;
   the flow inlet is adapted to pass the high pressure fuel therethrough into an interior of the flexure element; and
   the sensor side seal surface is formed in an end surface of the one axial end part of the flexure element around the flow inlet.

4. The fuel injection valve according to claim 1, wherein the fuel pressure sensing unit includes a holding member, which is installed to the flexure element and holds the signal processing circuit.

5. The fuel injection valve according to claim 4, wherein the holding member is non-rotatable relative to the flexure element.

6. The fuel injection valve according to claim 5, wherein:
   an insertion hole is formed in the holding member to receive the flexure element therethrough; and
   the flexure element is press fitted into the insertion hole of the holding member, and thereby the holding member is installed to and is non-rotatable relative to the flexure element.

7. The fuel injection valve according to claim 1, wherein:
   the flexure element is configured into a generally cylindrical hollow body having a flow inlet at one axial end part thereof and a closed bottom at the other axial end part thereof;
   the flow inlet is adapted to pass the high pressure fuel therethrough into an interior of the flexure element;
   the closed bottom of the flexure element forms a diaphragm, to which the sensor element is installed;
   the fuel pressure sensing unit includes a holding member, which is installed to the flexure element and has a receiving portion that receives and holds the signal processing circuit; and
   an insertion hole is formed in the receiving portion of the holding member and receives a cylindrical tubular portion of the flexure element therethrough to place the diaphragm in an interior of the receiving portion.

8. The fuel injection valve according to claim 1, wherein:
   the flexure element is configured into a generally cylindrical hollow body having a flow inlet at one axial end part thereof and a closed bottom at the other axial end part thereof;
   the flow inlet is adapted to pass the high pressure fuel therethrough into an interior of the flexure element;
   the threaded member has a cylindrical tubular portion, which is configured into a generally cylindrical tubular body that extends along an outer peripheral surface of the flexure element; and
   a threaded portion is formed in one of an outer peripheral surface and an inner peripheral surface of the cylindrical tubular portion of the threaded member and is threadably fastened to the injector body.

9. The fuel injection valve according to claim 8, wherein:
   the threaded member has a flange that radially outwardly projects from the outer peripheral surface of the cylindrical tubular portion; and an engaging portion is formed in a radially outer end surface of the flange and is configured to engage with an external rotary fastening tool.

10. The fuel injection valve according to claim 1, wherein the threaded member is assembled into the fuel pressure sensing unit in a state where the threaded member is rotatable relative to the flexure element.

* * * * *

UNITED STATES PATENT AND TRADEMARK OFFICE
CERTIFICATE OF CORRECTION

PATENT NO. : 8,365,705 B2
APPLICATION NO. : 12/753259
DATED : February 5, 2013
INVENTOR(S) : Kondo et al.

It is certified that error appears in the above-identified patent and that said Letters Patent is hereby corrected as shown below:

On the Title Page, Item (75) please correct the following to read:

(75) Jun Kondo, Nagoya (JP); Tomoki Fujino, Okazaki (JP); Hiroshi Tsuda, Nagoya (JP)

Signed and Sealed this
Fourteenth Day of May, 2013

Teresa Stanek Rea
*Acting Director of the United States Patent and Trademark Office*